United States Patent [19]

Bakken et al.

[11] Patent Number: 4,620,243
[45] Date of Patent: Oct. 28, 1986

[54] DISK DRIVE INCREMENTAL REWRITE

[75] Inventors: Kirby L. Bakken, Rochester, Minn.;
Robert G. Judson, Santa Clara, Calif.;
William E. Miller; Ronald A.
Peterson, both of Rochester, Minn.

[73] Assignee: International Business Machines Corporation, Armonk, N.Y.

[21] Appl. No.: 770,455

[22] Filed: Aug. 29, 1985

[51] Int. Cl.⁴ .......................... G11B 21/10; G11B 5/09
[52] U.S. Cl. .......................................... 360/77; 360/54
[58] Field of Search ....................... 360/77, 31, 25, 53, 360/54

[56] References Cited
U.S. PATENT DOCUMENTS 4,485,418 11/1984 Bremmer .............................. 360/77

*Primary Examiner*—Vincent P. Canney
*Attorney, Agent, or Firm*—Bradley A. Forrest

[57] ABSTRACT

A transducer head on a disk drive apparatus is offset about an expected center of a data track as indicated by servo information not included in the data track. If data does not have a predetermined level of readability, the head is known to be shifted with respect to the track. The data is then incrementally read and rewritten in a track centered about its expected center as indicated by the servo information. The amount of data incrementally rewritten at one time is a function of the disk characteristics and the amount of resources available to temporarily store the data. If more than one track appears shifted with respect to the head, the order of rewriting the tracks is selected to minimize risk of overlapping the tracks during the writing.

17 Claims, 7 Drawing Figures

DISK DRIVE INCREMENTAL REWRITE

BACKGROUND OF THE INVENTION

The present invention relates to disk drive storage devices and in particular to ensuring continued usability of such devices.

In a dedicated servo design disk drive, servo information is written on one disk surface, with the other disk surfaces containing data written on tracks. A servo transducer senses the servo information.

Data transducers are moved to tracks of data as a function of the servo information. The data transducers must be located substantially over the tracks of data in order to read the data. Radial shift of the data transducers with respect to the transducer sensing the servo information causes the data transducers to not be located substantially over the tracks of data. Data tracks therefore appear to shift with respect to their expected positions. Data may be lost when such shifting occurs, and in any event, time is wasted trying to locate the data. Replacement of the disk/head assembly may be required.

The shift of transducers and data tracks is caused by a number of factors, many of the interrelationships of which are not well understood or controllable. Some of the causes include time and temperature induced changes in transducer suspension and support, radial run out of spindles on which the disks are mounted, bearing wear, disk clamping, and warp of spindle caused by drive mechanisms. Correction of one of the above causes may result in increased contribution to the transducer misalignment from the other causes.

When the number of read errors increases in a file, the user presently has several options. The user can continue to use the file and accept the errors, or the user can off load all the data in the file to an independent storage device and have the misalignment corrected by replacement of major assemblies. This exposes all of the data to mishandling and potential loss.

One method of determining the center of a track of data is discussed in U.S. Pat. No. 4,485,418 to Bremmer. The amplitude of a signal from the transducer is measured as the transducer is moved to each side of the track and compared to a predetermined reference level. The transducer can then be moved to the center of the track using an offset capability. This requires time, which reduces the average seek time of the disk drive. It also does not alleviate the problem of warpage of the spindle or other causes wherein the track of data is misaligned with the servo information.

SUMMARY OF THE INVENTION

Degraded readability of information stored in tracks on a disk is detected under control of an algorithm. A transducer reads information and is moved over portions of the track radially to determine the readability of the information. If information is being read in error within predetermined limits of radial movement, it is known that the track is misaligned with respect to the transducer. A portion of data from the disk or disks is then read and stored. It is then rewritten so that the transducer will be centered over the information the next time the information is read. Thus, only a portion of the data is at risk under control of the algorithm without the risk of human intervention, while readability is greatly enhanced.

When degraded readability is detected, the direction of misalignment is noted. When the data is rewritten the data tracks are moved in an order such that adjacent tracks are not written close to each other. If it is noted that more than one track appears shifted radially inward, the outermost of the tracks is rewritten first so that two tracks are not written close together which may cause loss of data. If the innermost track were written first in a position corresponding to the shifted transducer location, radially outward, interference with the next radially outward track which had appeared to be shifted inward may result.

Track readability is sampled during normal operation of the disk drive, and is performed without significant degradation of response time to users. When a transducer is determined to be misaligned with respect to the data tracks, the data on a disk or multiple disks are rewritten incrementally in positions centered under the data transducers. This provides the benefit of minimal risk to only incremental pieces of data at any given time.

DETAILED DESCRIPTION OF THE INVENTION

Figure 1:
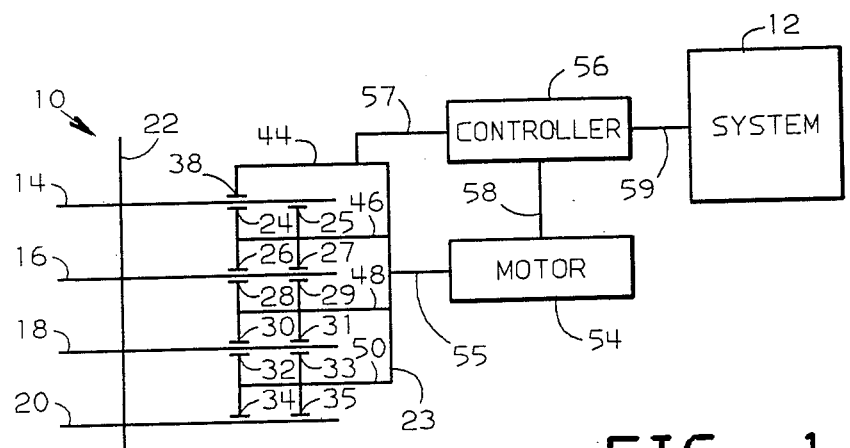
FIG. 1 is a block diagram representation of a disk drive readability detector and incremental reformatter in accordance with the present invention.

Indicated generally at 10 in FIG. 1. is a disk drive coupled to a computer system 12. A plurality of disks 14, 16, 18, and 20 are rotatably coupled as by a spindle 22 and contain data arranged in circular tracks concentric with spindle 22. An actuator assembly 23 comprises a plurality of data transducers (commonly referred to as heads) 24 through 35 and a servo transducer 38 which are supported by suspensions 44, 46, 48, and 50 which in turn are moveably coupled to actuator assembly 23.

The top surface of disk 14 contains servo information which is read by head 38 and used to align all the data heads to tracks on other surfaces of disks. A new disk drive will preferably have all the heads substantially centered over the tracks of data on each disk surface in accordance with the servo information. With time, the heads shift radially from the spindle 22 and perpendicularly with respect to the tracks resulting in degraded readability and sometimes inability to write data or loss of data. Loss of data may result when the heads can no longer be offset from the nominal on track position (the position indicated by the servo information) in order to read data.

Causes of head shift include time and temperature induced changes in transducer suspension and support, radial run out of spindles on which the disks are mounted, bearing wear, disk clamping, and warp of spindle caused by drive mechanisms.

A motor 54 is coupled by a physical connection represented by line 55 to the actuator assembly 23 to move the support assembly such that the heads are in position to read the data on the tracks. A controller 56 receives servo information from head 38 by a communicative connection represented by line 57 and controls the motor via connection 58 to move the assembly 23 as desired. The controller is also communicatively coupled by line 59 to system 12 to receive commands indicating the data desired by the system 12 and to provide the system such data.

Figure 2:
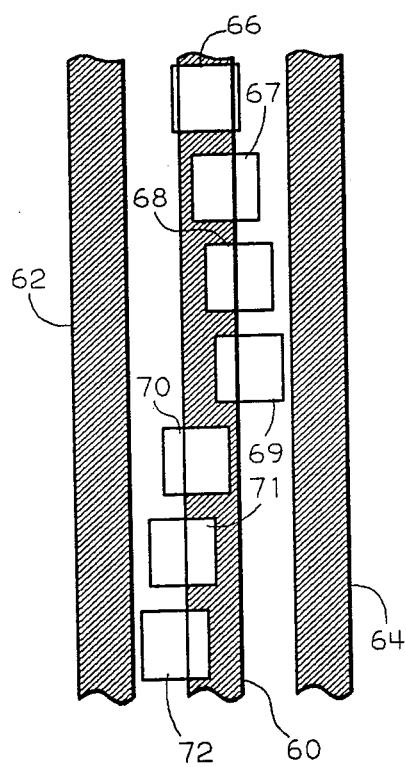
FIG. 2 is a top view representation of a transducer effective read area being shifted radially across a track of data from an initially centered condition.

In FIG. 2 a top view of a data track 60 with adjacent data tracks 62 and 64 is shown. It is to be understood that the edges of the track as shown in the figures indicate where a predetermined signal strength can be received, such as the 3 dB point of the track. Several different radially shifted head positions 66, 67, 68, 69, 70, 71 and 72 are indicated on track 60. The shifted head positions are obtained by controller 56 offsetting the heads from the position indicated as the center of the data track by the servo information in accordance with an algorithm in System 12. Head position 66 is not offset and data is read with minimal error. At head positions 67, 68, and 69, a few more errors are encountered, but data is still readable. Head position 69 corresponds to a predetermined maximum offset. Further offsetting of the head would result in data from the next track 64 beginning to interfere with reading of the data on track 60.

Head positions 70, 71 and 72 represent offsetting the head in the opposite radial direction from the offset indicated by head positions 67, 68 and 69. Again, at the maximum head shift at position 72, the data is still readable. Thus it is known that in FIG. 2, the head has not shifted significantly and the expected position of the track is accurate.

System 12 causes the heads to offset after thermal equilibrium has been reached in the disk drive file to determine if tracks have shifted with respect to the heads. The offsets are done using sampling techniques to minimize interference with normal file operations. The sampling is preferably performed when system requests for disk drive 10 are low. The order of sampling different disk surfaces is controlled by the algorithm such that each surface is tested for readability. Those skilled in the art will easily implement different sampling schemes taking into account the specific characteristics of the disk drive implementing the present invention.

Further methods of finding if data is shifted are apparent, such as not limiting the head shift to a predetermined amount and shifting the head in one direction until a track edge is indicated. Since track widths are known on the file where the invention has been implemented, it will be known from the amount of offset whether the track has shifted with respect to the expected position.

A track edge as seen by a head occurs when the error rate detected by the controller 56 (or system 12 in a further embodiment) increases to a predetermined rate. Most of the errors are cyclical redundancy check errors, until the offset is very large, which results in errors in reading synchronization bits. The edge of the track is normally selected such that it is detected before sync bit errors occur.

Figure 3:
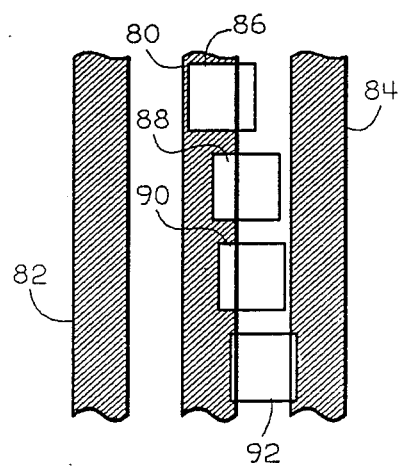
FIG. 3 is a top view representation of a transducer effective read area being shifted radially across a track of data from an initially off center condition.

A top view of a data track 80 with adjacent data tracks 82 and 84 is indicated in FIG. 3. A head position 86 on track 80 indicates the position of the head with respect to the center of track 80 as indicated by the servo information. It is noticed that the head position 86 is located radially outward from the true center of the track, assuming that the spindle is toward the left.

The head is offset during a sampling period by controller 56 and motor 54 as indicated at 88, 90 and 92. Errors start to occur at 88, from lack of signal. More errors are noted at head position 90, which indicates to the system 12 that the head is shifted outward with respect to the track. The increase in errors at head position 90 is due to data signal contribution from data track 84. If the head were moved to the position indicated at 92, the data would be very difficult to read if it could be read at all because the effective read area of the head covers a portion of track 84. It is known that the head has shifted outward with respect to the track because of the known direction of head offset.

Figure 4:
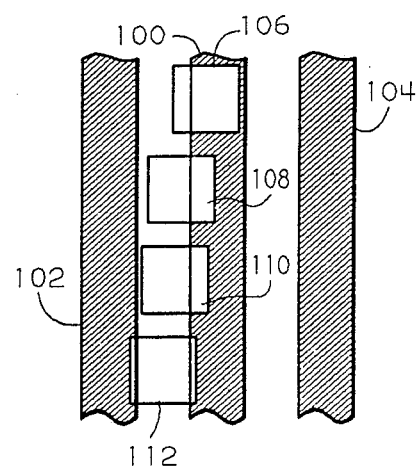
FIG. 4 is a top view representation of a transducer effective read area being shifted radially across a track of data from an initially off center condition opposite that of FIG. 3.

In FIG. 4, a similar head offset is performed by controller 56. A track 100 and adjacent tracks 102 and 104 are indicated. A head position is indicated at 106 corresponding to the expected position of track 100 as a function of the servo information. The position 106 of the head with respect to the track 100 is shifted radially inward with respect to the track. The head is offset as indicated at 108, 110, and 112. Similar to FIG. 3, errors are detected, indicating that the track has shifted with respect to the head. This time, the direction of offset indicates that the shift of the head position is radially inward. If data were still readable after the shift to the left as indicated, the head would then be shifted to the right.

In the preferred embodiment, the data tracks contain identification fields which identify the location of a length of track on which a block of data can be written. It also contains other information about the track, such as which disk surface it is located on and whether or not it contains defects. The identification fields are not rewritten during normal operation of the file. During the head offset sampling shown in FIGS. 2, 3, and 4, the data read is preferably the identification fields. Since blocks of data could have been written with a head already shifted, sampling of the blocks of data would not necessarily indicate that a shift has occurred. The identification fields have not been rewritten, and hence yield a better indication of shift.

When a shift has been detected by an increase in the error rate in reading the identification fields prior to the expected edge of the track, data is rewritten. The data is rewritten incrementally. The data and identification fields on the first track are read and stored in available memory. The identification fields and the data are then written back onto the track in a position which is now the center of the track. The new center of the track is shifted from the original center, but is accurately indicated by the servo information as the expected center. The next track is then read and rewritten. Rewriting of tracks is preferably done during a customer initiated power down sequence.

In the preferred embodiment, there are two actuators 23 in the file. Each actuator has three data arms 46, 48 and 50 with four heads on each arm as indicated in FIG.

1. In general, the amount of data to rewrite at a time can range from one block to the entire portion of the file which is shifted. To rewrite an entire arm, may require a device such as a tape drive due to the limitations on the size of available memory. Rewriting one block at a time is likely to be too slow. The preferred amount chosen is four tracks (one cylinder), corresponding to one arm, which has four heads, for one rotation of the disks. This happens to correspond to 256 blocks of data. This amount of data is safely stored by system 12 in nonvolatile memory and rewritten in the desired radial position which is the expected track center.

The shift detection algorithm must be designed to meet two conflicting goals: (1) to find the worst case track on the file, and (2) to do that in minimum time. In the preferred embodiment, the detection algorithm ran on two adjacent tracks, close to the disk inner diameter. Two adjacent tracks were chosen for two reasons: (1) provide more opportunity to detect a shift and (2) eliminate the possibility that one track appeared wider (or narrower) than an adjacent track due to tolerances in the servo tracking system. Tracks close to the disk inner diameter were chosen due to the higher bit density at the disk inner diameter, and the corresponding greater potential of errors due to a shift condition.

Figure 5:
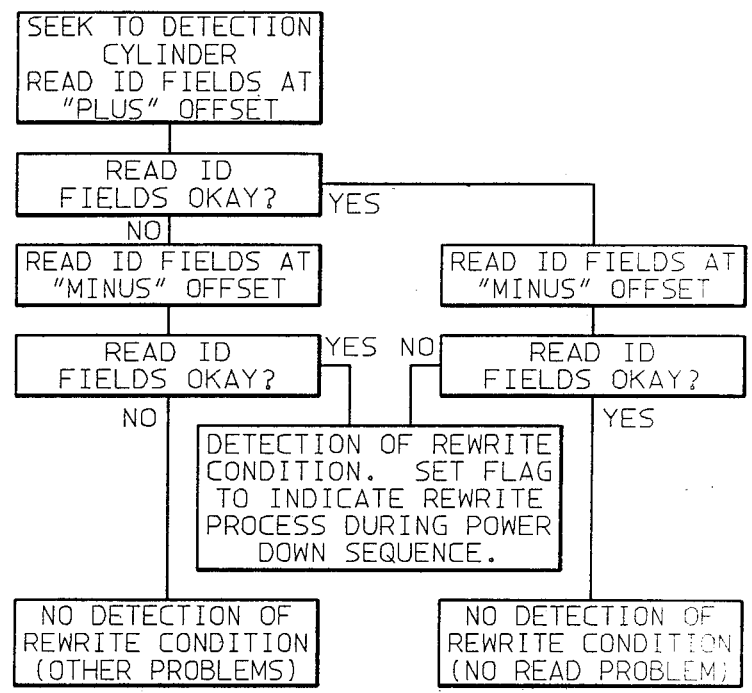
FIG. 5 is a flowchart diagram of the algorithm controlling detection of readability of data stored on disks of the disk drive.

FIG. 5 shows a flow chart of the detection algorithm which has been implemented. The algorithm is initiated following a suitable time period after power on of the disk drive to allow for thermal equilibrium of the drive. The heads are first moved to tracks identified in the flowchart as a detection cylinder at which the identification (ID) fields are read with a plus offset. The identification fields are then read again at a minus offset. If data at one of the readings, either the first or at the offset is not readable, a flag is set to indicate that rewrite should be performed during a power down sequence.

Because of the complexity of head shifting causes, it may be necessary to determine whether or not the rewrite operation occurring on any given track may be jeopardizing the data on the next track. One method of performing this check is to read the ID fields of the current track with a small offset in the direction of apparent head shift. If the ID fields are successfully read, the rewrite operation safely continues. If the ID fields cannot be read at this small offset, the heads may have moved too far for the rewrite operation to continue while guaranteeing 100% readability of the next physical track.

Figure 6:
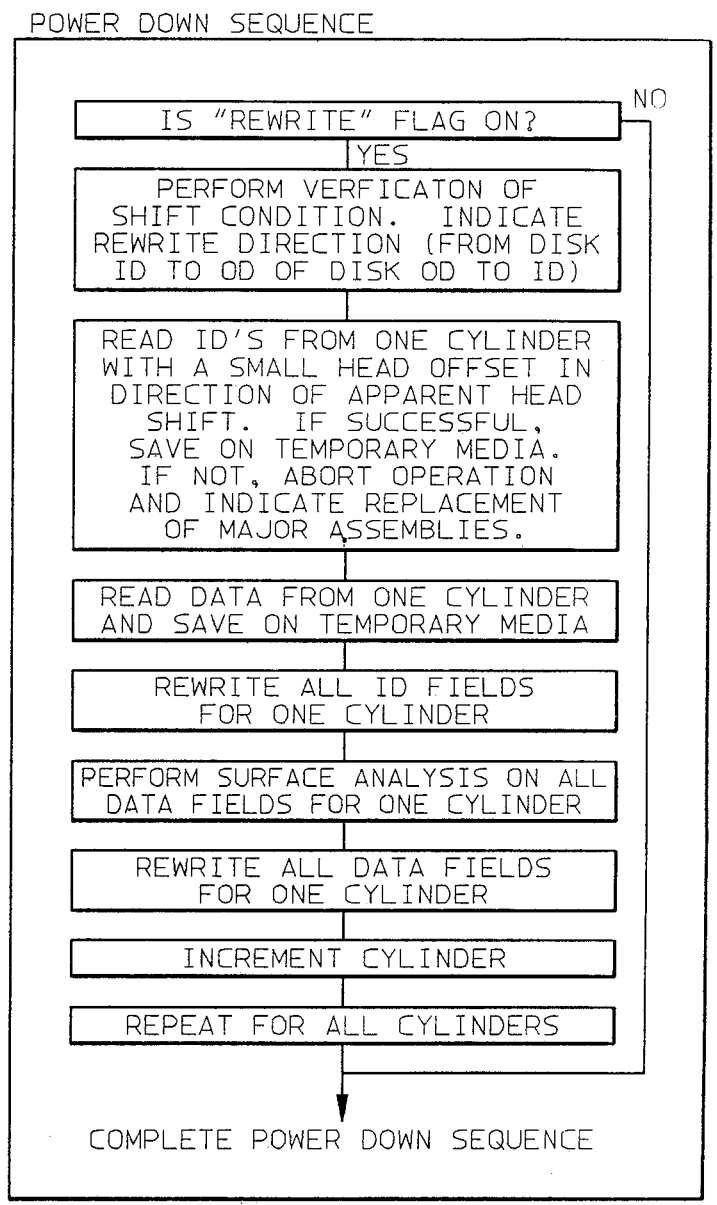
FIG. 6 is a flowchart diagram representing reformatting of the disk drive on power down following detection of unreadability.

At power down of the drive, as indicated in the flow diagram in FIG. 6, the rewrite flag is checked. If the flag is on, a check is made to verify the rewrite condition. IDs from one cylinder are then read as described immediately above. If readable, the data from the cylinder is read and the IDs and data are saved on temporary media. The ID fields are then rewritten and checked. The data is then written and the heads are moved to the next cylinder.

Figure 7:
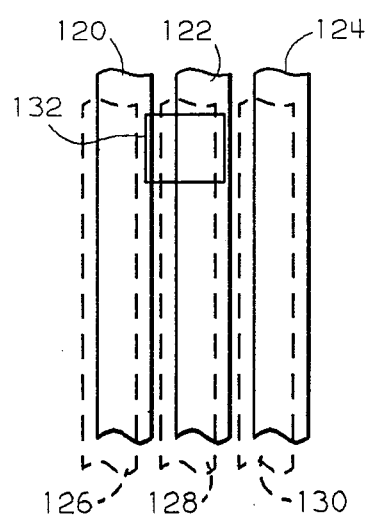
FIG. 7 is a top view representation of shifted data on a disk surface with respect to original track locations in a high track density disk drive device.

Closely spaced tracks of data are indicated in FIG. 7. Tracks 120, 122, and 124 indicate the actual position of data not recently rewritten. Tracks 126, 128, and 130 indicate the expected position of data, which is shifted radially inward, assuming the spindle is located to the left, or closest to expected track 126. A data transducer 132 is shown centered over expected track 128.

If track 124 were rewritten in expected position 130 first, there would be a potential for interference in reading the next track 122 before rewriting it. One means of avoiding this interference is to read a track ahead when rewriting more than one track. Both tracks 124 and 122 would be read first, track 124 rewritten, then track 120 read. Track 122 could then be safely rewritten, followed by reading the next track and rewriting track 120.

The preferred method of rewriting tracks involves starting in the opposite direction from which the tracks are shifted, in this case, track 120. When track 120 is read and rewritten in expected track 126, no interference results when reading and writing the next track 122 onto expected track 128 because track 120 was rewritten further away from expected track 128 and track 122. This method of rewriting tracks continues with track 124 and further tracks not shown until all tracks have been rewritten.

While the invention has been described in terms of preferred embodiments, it is not intended that the preferred embodiments limit the scope of the claims. It is apparent to those skilled in the art, that control of the head shifting during sampling periods could be transferred to the controller 56, or error determination could be accomplished by system 12. Similarly, different increments of data can be rewritten depending on the amount of utilization of the disk drive file, or on the resources available to system 12. Static ram in controller 56 could even be used to store the data being rewritten if desired.

What is claimed is:

1. A system for detecting degraded readability of information stored in tracks on a disk surface of a multiple disk surface disk drive and rewriting selected portions of the information, the system comprising:

a transducer means for reading and recording information on the disk, the transducer means being moveable from track to track as a function of servo information on a different disk surface and being moveable over portions of each track;

detection means coupled to the transducer means for detecting degraded readability of the information as the transducer means is moved about an expected center of a selected track as indicated by the servo information; and control means for storing selected increments of information from the transducer means and providing such information to the transducer means for recording onto the selected track at its expected center as a function of the readability of the information.

2. The system of claim 1 wherein the detection means comprises an error detector and wherein the readability of the information is a function of the number of errors detected while reading the information.

3. The system of claim 1 wherein the control means causes the transducer means to be radially offset from the expected center of the track in a first direction during sampling periods and the detection means detects the readability of the information with the transducer in the offset position.

4. The system of claim 3 wherein the control means causes the transducer means to be radially offset from the expected center of the track in a second direction opposite the first direction when the information readability was acceptable at the offset in the first direction.

5. The system of claim 3 wherein the sampling periods are controlled by the control means to occur after the disk has reached thermal equilibrium.

6. The system of claim 1 and further having multiple disks for storage of information, wherein servo data for centering the transducer means on the tracks is not on the same track as the information.

7. The system of claim 6 wherein the servo data is contained on a disk surface separate from the disk surface containing the information and a servo transducer separate from the transducer means reads the servo data from which the transducer means is position about the expected center of the track.

8. A method of detecting degraded readability of information stored in tracks on a disk drive comprising the steps of:
   a. offsetting a transducer a predetermined amount in a first direction radially from the expected center of a track;
   b. determining the readability of the data at the offset position in the first direction;
   c. offsetting the transducer a predetermined amount in a second direction opposite the first direction from the expected center if the data was readable;
   d. determining the readability of the data at the offset position in the second direction;
   e. reading at least portions of the data which had less than a predetermined level of readability; and
   f. rewriting said data in the expected center of the track such that its readability is increased.

9. The method of claim 8 wherein steps a through d are performed on another track to determine if more than one track has shifted from its expected position.

10. The method of claim 9 wherein if more than one track is determined as having shifted, steps e and f are performed on each track in an order which reduces the risk of losing data.

11. The method of claim 9 wherein if more than one track is determined as having shifted, steps e and f are performed on each track on the disk surface, starting with the track which will be rewritten further from the expected position of the next adjacent track, and continuing with each successive adjacent track.

12. A system for detecting degraded readability of information stored in tracks on a disk and rewriting selected portions of the information in the center of an expected track location, the system comprising:

a transducer means for reading and recording information on the disk, the transducer means being moveable from track to track and over portions of each track about the expected track location;

detection means coupled to the transducer means for detecting degraded readability of the information as the transducer means is moved about an expected center of a selected track;

temporary storage means coupled to the transducer means for storing selected increments of information whose readability was detected as degraded; and control means for controlling the transducer means as it moves about the expected track location and causing the transducer means to provide the temporary storage means with information and the storage means to provide such information to the transducer means for recording onto the track at its expected location as a function of the readability of the information.

13. The system of claim 12 wherein the temporary storage means is nonvolatile.

14. The system of claim 12 wherein the detection means comprises an error detector and where degraded readability is a function of the rate of errors detected.

15. The system of claim 14 wherein the control means controls the transducer means to move a predetermined distance either side of the expected center of the track so that the detection means can determine the readability of the information being read at each predetermined distance.

16. The system of claim 15 wherein a predetermined rate of errors at either predetermined distance from the expected center of the track causes the control means to cause rewriting of the track of data at the expected track location.

17. The system of claim 12 wherein the data comprises identification fields which are not normally rewritten during operation of the disk and wherein the transducer reads the identification fields for the detection means to determine the readability of the data.

* * * * *